Figure 1:
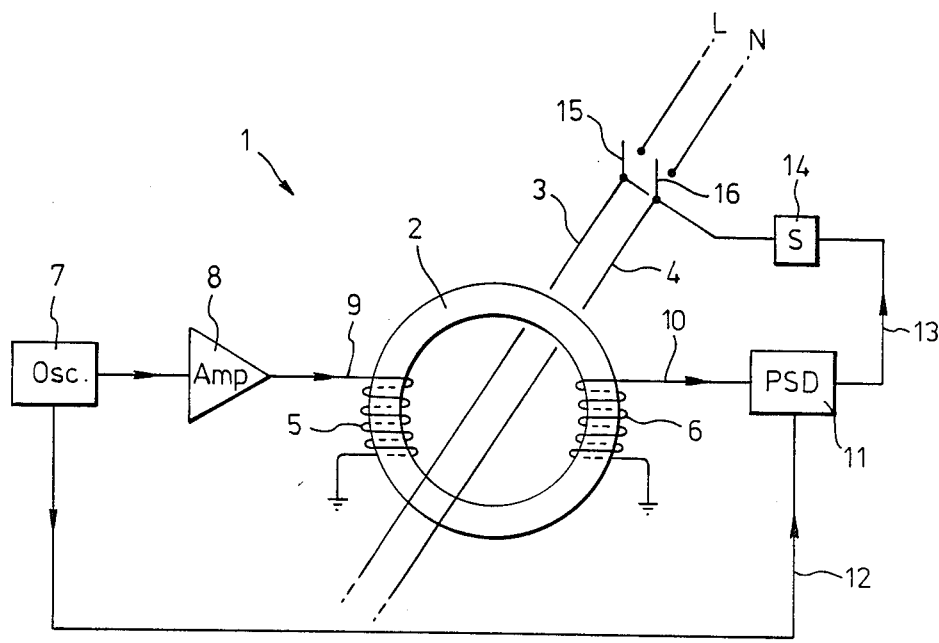

United States Patent [19]

Dhar

[11] Patent Number: 4,725,913
[45] Date of Patent: Feb. 16, 1988

[54] RESIDUAL CURRENT DETECTOR

[75] Inventor: Pronab K. Dhar, East Molesey, England

[73] Assignee: BICC Public Limited Co., London, England

[21] Appl. No.: 856,752

[22] Filed: Apr. 28, 1986

[30] Foreign Application Priority Data

May 14, 1985 [GB] United Kingdom ................ 8512133

[51] Int. Cl.$^4$ ............................................. H02H 3/16
[52] U.S. Cl. ........................................ 361/44; 361/46; 361/47
[58] Field of Search ...................................... 361/42–50

[56] References Cited

U.S. PATENT DOCUMENTS

| 3,801,871 | 4/1974 | Loh | 361/45 |
| 3,895,263 | 7/1975 | Clark | 361/46 |
| 3,932,790 | 1/1976 | Muchmick | 361/46 X |
| 3,978,400 | 8/1976 | Pettit | 361/44 X |
| 4,068,276 | 1/1978 | Pirrtell | 361/50 X |
| 4,080,640 | 3/1978 | Elms et al. | 361/49 X |
| 4,228,475 | 10/1980 | Sherwood | 361/47 |
| 4,233,640 | 11/1980 | Klein et al. | 361/46 |

FOREIGN PATENT DOCUMENTS

| 69655A | 1/1983 | European Pat. Off. . |
| 2555303 | 6/1977 | Fed. Rep. of Germany . |
| 2099548 | 3/1972 | France . |
| 2223825 | 10/1974 | France . |
| 2358663 | 2/1978 | France . |

Primary Examiner—J. R. Scott
Assistant Examiner—Jeffrey A. Gaffin
Attorney, Agent, or Firm—Parkhurst & Oliff

[57] ABSTRACT

A residual current detector capable of detecting an earth leakage current, e.g. for use in a circuit breaker, includes a toroidal core through which passes the live and neutral wires of an electrical installation, to form the primary windings of a differential transformer. At least one secondary winding is wound on to the core and driven with an alternating voltage by a generator. A phase sensitive detector identifies a residual current by detecting the change in phase of the voltage across the at least one secondary winding. The secondary winding may comprise two coils, a first coil driven by the generator and a second coil adapted to pick up an induced voltage from the toroidal core. The phase sensitive detector, which may form part of a phase locked loop, compares the phase of the signal from the second coil with that of the alternating voltage of the generator.

7 Claims, 7 Drawing Figures

RESIDUAL CURRENT DETECTOR

This invention relates to current detectors, particularly for the detection of an earth leakage current. Such detectors are primarily, but not exclusively, employed in circuit breakers.

Many known circuit breakers such as those known in Great Britain Pat. Nos. GB1448934, GB1585783 and GB1359714 employ a differential transformer in the form of a toroidal coil having current bearing wires passing therethrough, and a secondary coil wound thereon to detect any change in the magnetic field caused by an earth leakage current. One circuit breaker, described in EP0069655A has a driving voltage applied to the secondary coil and means to detect a change in amplitude caused by an earth leakage current. This invention constitutes an alternative construction to that of EP0069655A.

Accordingly, there is provided apparatus for the detection of a residual current in an electrical installation comprising a differential transformer having a toroidal core through which passes the live and neutral wires for the electrical installation to form the primary windings of the transformer; at least one secondary winding wound onto the core; a generator adapted to drive the at least one secondary winding with an alternating voltage; and a phase sensitivity detector adapted to detect a change in the phase in the alternating voltage of the at least one secondary winding.

The term 'change in the phase' is herein meant to include not only a displacement in time of the voltage signal, but also a change in a phase related component of the signal such as the rate of decay of the voltage signal.

Preferably, the phase sensitive detector is adapted to actuate a cut out device to interrupt at least one of the live and neutral wires in response to a change in phase greater than a predetermined threshold value.

When there is no earth leakage in the installation, the current flowing along the live and neutral wires will be equal and opposite. Should a residual current such as an earth leakage current develop, these currents will become unequal and a magnetic flux will be induced in the toroidal core of the differential transformer. The presence of this induced magnetic flux will cause a change in phase of the voltage signal present in the at least one secondary winding of the transformer, which change in phase is detected by a phase sensitive detector.

Preferably, the at least one secondary winding comprises two coils, a first coil driven by the generator with an alternating voltage, and a second coil adapted to pick up an induced voltage from the toroidal core, the phase sensitive detector comparing the phase of the signal from the second coil with that of the alternating voltage of the generator.

Conveniently, the generator is adapted to produce a drive voltage such that the toroidal core is driven into positive and negative saturation. As the core is driven cyclically through its hysteresis loop, residual magnetic effects due to the magnetic remnance of the core are eliminated. Preferably, the generator is adapted to produce a drive voltage in the form of a square wave, typically at a frequency of 500 Hz.

The phase sensitive detector preferably comprises a part of a phase locked loop. Such loops are known in the art and available in single chip form, e.g. NE-567 from RS Components or CMOS4046B.

The present invention further resides in a method of detecting a residual current in an electrical installation incorporating the above described apparatus. In particular a method of detecting a residual current in an electrical installation comprises the steps of passing the live and neutral wires for the electrical installation through a toroidal core to form the primary windings of a differential transformer, passing an alternating drive voltage across at lease one coil wound onto the core to form the secondary windings of the transformer and detecting any change in the phase of the alternating voltage with a phase sensitive detector.

Figure 4:
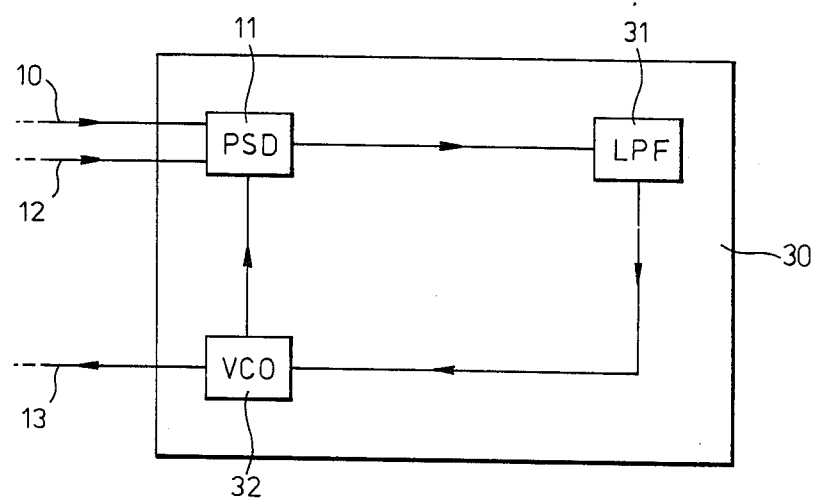
Figure 2:
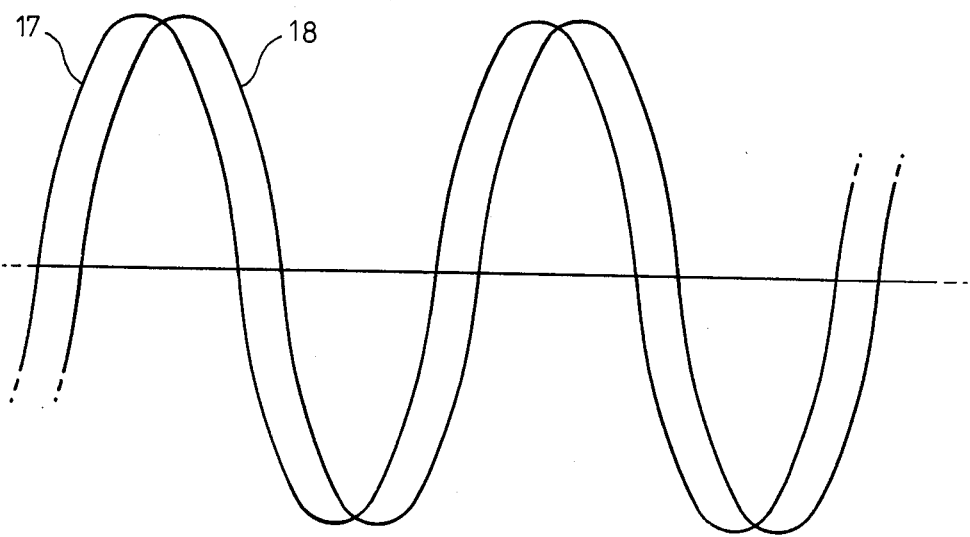
Figure 2A:
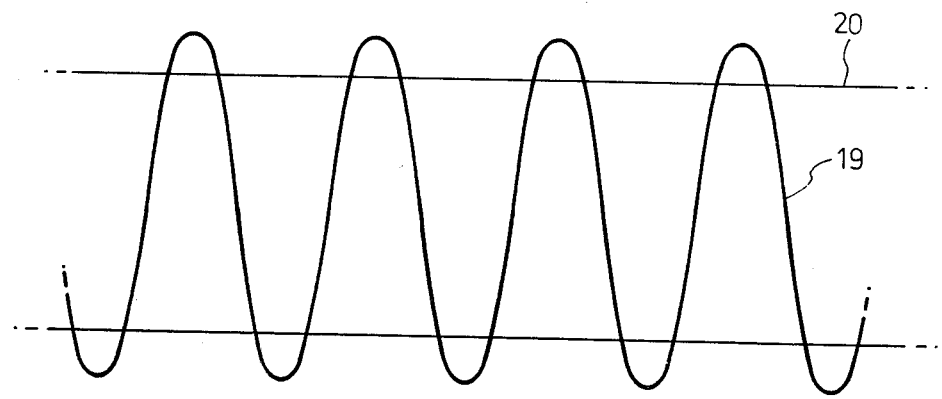
Figure 3:
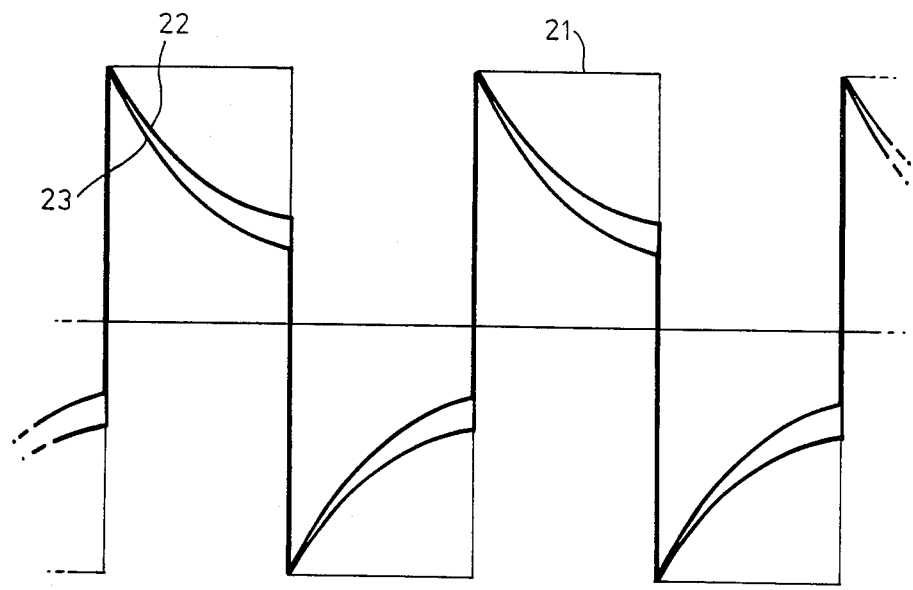
Figure 3A:
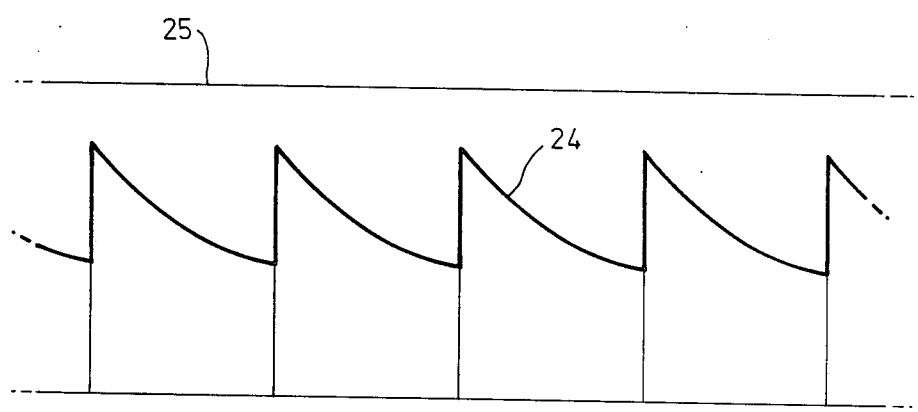
Figure 5:
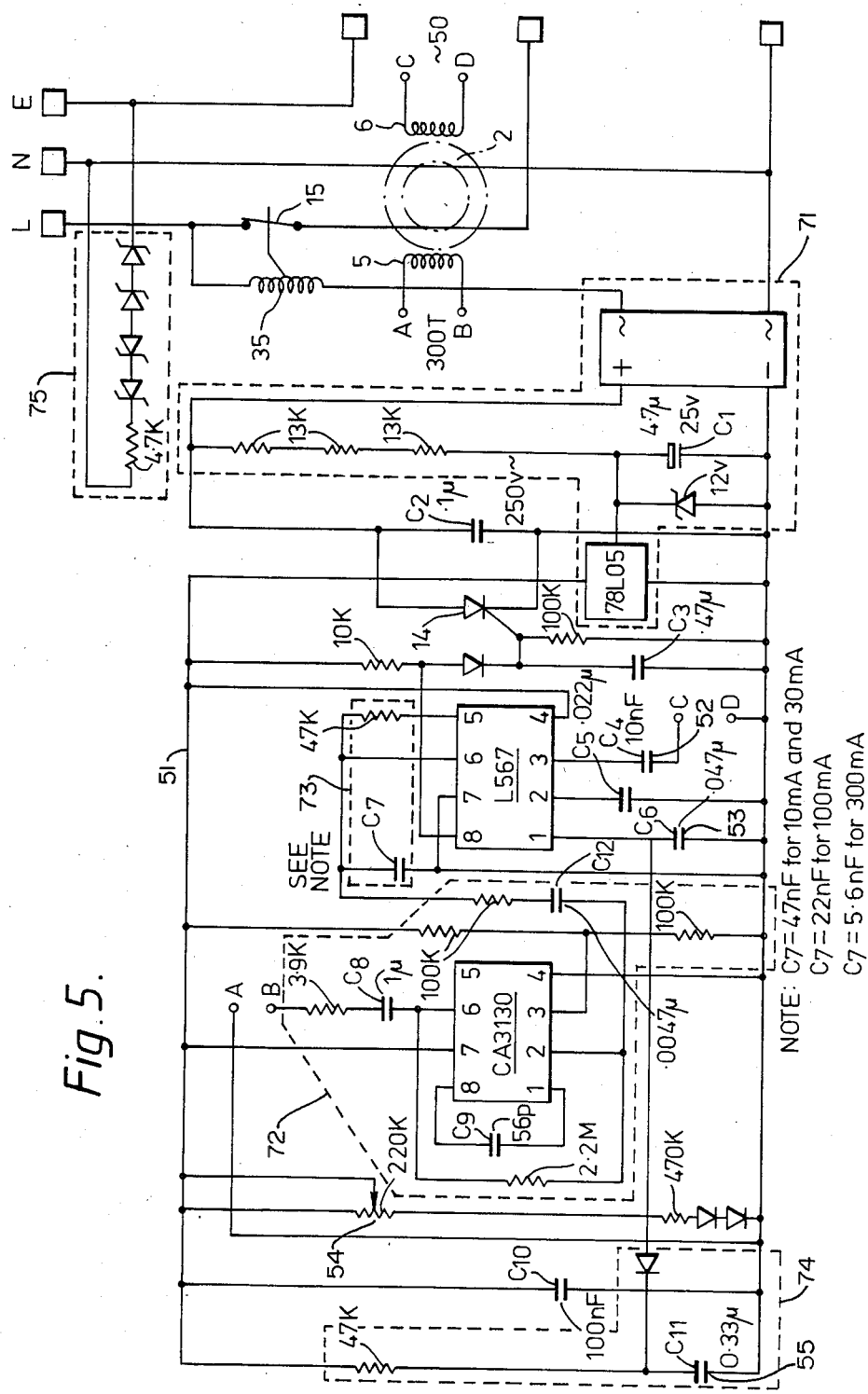

The invention will now be further described, by way of example only, with reference to the accompanying drawings in which:

FIG. 1 is a schematic diagram of the apparatus according to the present invention, FIGS. 2 and 2a show typical waveforms from the circuit of FIG. 1, FIGS. 3 and 3a show alternative waveforms from the circuit of FIG. 1, FIG. 4 shows a block diagram of a phase locked loop incorporating the phase sensitive detector of FIG. 1, and FIG. 5 shows a circuit diagram of the apparatus according to the present invention.

Referring to FIG. 1 a circuit breaker shown generally at 1 comprises a toroidal core 2 through which passes the live and neutral wires, 3 and 4 respectively, of an electrical installation. The wires 3 and 4 form the primary windings of a differential transformer, the secondary windings of which are constituted by two coils 5 and 6 wound on to the toroidal core 2.

An oscillator 7 supplies an alternating drive voltage, amplified by means of amplifier 8, to the coil 5 by means of line 9. The coil 6 is connected via line 10 to a phase sensitive detector 11. A line 12 also connects the oscillator 7 with the phase sensitive detector 11. An output line 13 from the phase sensitive detector 11 supplies electrical signals to a thyristor switch 14 which governs the opening of circuit breaker contacts 15 and 16 in the live and neutral wires 3 and 4 respectively.

In use, the oscillator 7 drives the coil 5 with an alternating voltage such as the sinewave 17 of FIG. 2. With no earth leakage current present in the electrical installation, the current flowing through the live wire 3 and the neutral wire 4 will be equal and opposite. Hence no magnetic flux will be induced in the core 2 by the primary winding of the transformer and the coil 6 will have a voltage signal induced therein which is equal in phase to that of coil 5. In the event of an earth leakage current, the current in wires 3 and 4 will not be equal and a corresponding magnetic flux will be induced in the core 2. This flux causes a change in phase of the signal as induced in coil 6, as shown at signal 18 in FIG. 2.

The phase sensitive detector 11 multiplies together the signal 17 received from the oscillator 7 via line 12, and the signal 18 received from the coil 6 via line 10. The resulting waveform 19, shown in FIG. 2a, can be averaged by a low pass filter to give a DC output 20, the amplitude of which depends on the difference in phase between the signals 17 and 18. When the DC signal 20 drops below a predetermined threshold, due to a significant earth leakage current, an actuating signal is sent via line 13 to trip the thyristor switch 14 to open the circuit breaker contact 15 and 16.

The oscillator 7 may alternatively provide a driving voltage in the form of a square wave as shown at signal 21 in FIG. 3. The voltage E induced across the coil 6 is given by the equation $$E = -L\frac{di}{dt}$$

where L is the self-inductance of the coil.

The voltage induced across the coil is hence generated when the square wave 21 switches, decreasing exponentially with a time constant=L/R. This is shown at element 22 in FIG. 3. An earth leakage current causing a magnetic flux to be generated in the core 2, changes the phase of the signal induced in the coil 6 to the extent that the rate of decay of the signal is altered, as shown at signal 23.

Multiplication of the signals 21 and 23 by the phase sensitive detector 11 produces the waveform shown in FIG. 3a at element 24. Averaging by a low pass filter again produces a DC voltage 25 which varies with the change in phase between the signals 21 and 23 and can be used to activate the thyristor switch 14.

FIG. 4 illustrates the use of the phase sensitive detector in a phase locked loop, shown generally at 30. The output from the phase sensitive detector 11 is passed through a low pass filter 31 to a voltage controlled oscillator 32, which generates an alternating detector 11 to keep it locked on to the appropriate signal. The output from the VCO 32 is necessary to keep the loop locked in phase and can be used as a signal to activate the thyristor switch 14 and open the circuit breaker contacts 15 and 16 should the phase of the signal from the coil 6 vary sufficiently. Phase locked loops are available on single chips such as the XR-L567 or CMOS 4046B.

FIG. 5 shows a circuit diagram for the above described apparatus. Chip L567 generates at pin 6 a 500 Hz waveform which is amplified by operational amplifier CA3130 into a 0.5 mA signal which is used to drive coil 5 connected between points A and B. The phase sensitive detector chip L567 provides a DC output signal at pin 8 which is used to actuate thyristor 14 to energise coil 35 to interrupt the live line 3 by opening circuit breaker contact 15.

Section 71 of the circuit is the power supply both for energizing of coil 35 to open circuit breaker contact 15, and also, via voltage regulator chip 78LO5, for the remainder of the electrical circuit to provide power rail 51. Chip L567 generates on pin 6 a 500 Hz sawtooth waveform which is amplified by amplifier section 72 of the circuit. This provides the signal which is used to drive coil 5 connected between points A and B.

The signal from coil 6 is fed to pin 3 of chip L567 via DC blocking capacitor 52. The RC combination 73 sets the frequency for the VCO of the phase locked loop. A phase sensitive detector within the L567 multiplies the signal from coil 6 with the output of the VCO. The resulting signal is averaged by capacitor 53 to form a DC signal on pin 1 which varies the phase of the signal from the coil 6. When a ground leakage fault is present, the DC level on pin 1 will exceed the reference voltage of a comparator within the L567, and a signal is generated on pin 8 of the L567 which causes thyristor 14 to switch in the power to energize coil 35 and open the contact 15. Variable resistor 54 can be used for fine tuning the level of the DC signal on pin 1 and hence varying the difference between this DC voltage level and the tripping reference voltage of the comparator within the L567.

Section 74 of the circuit provides a time delay to prevent nuisance tripping when the device is switched on and the power is first supplied to the circuit. Until capacitor 55 is charged, the voltage on pin 1 of the chip L567 cannot be sufficient for a trip signal to be generated during power-up.

Section 75 of the circuit provides tripping of the device in the event of an abnormally large voltage being present on the neutral line of the electrical installation. Should the neutral voltage exceed approximately 50 volts, the Zener diodes will conduct allowing the neutral voltage to leak to ground. This will create an imbalance between the neutral and live lines and cause tripping of the device in the usual way.

I claim:

1. Apparatus for the detection of a residual current in an electrical installation including live and neutral wires, the apparatus comprising a differential transformer having a toroidal core through which passes said live and neutral wires to form the primary windings of the transformer; at least one secondary winding wound on to the core; a generator for driving said at least one secondary winding with an alternating voltage such that an imbalance in the currents in said live and neutral wires causes a change in phase of the alternating voltage across said at least one secondary winding; and a phase sensitive detector for detecting a change in the phase of the alternating voltage of said at least one secondary winding, the phase sensitive detector providing an action signal in response to a change in phase greater than predetermined threshold value.

2. Apparatus according to claim 1 wherein the action signal provided by the phase sensitive detector actuates a cut off device to interrupt at least one of the live and neutral wires.

3. Apparatus according to claim 1 wherein the at least one secondary winding comprises two coils, a first coil driven by the generator with an alternating voltage, and a second coil which picks up an induced voltage from the toroidal core, the phase sensitive detector comparing the phase of the signal from the second coil with that of the alternating voltage of the generator.

4. Apparatus according to claim 1 wherein the generator produces a drive voltage such that the toroidal core is driven into positive and negative saturation.

5. Apparatus according to claim 1 wherein the generator produces a drive voltage in the form of a square wave.

6. Apparatus according to claim 1 wherein the phase sensitive detector comprises a part of a phase locked loop.

7. A method of detecting a residual current in an electrical installation comprising the steps of passing live and neutral wires for the electrical installation through a toroidal core to form primary windings of a differential transformer, the core having at least one coil wound thereon to form secondary windings of the transformer; passing an alternating drive voltage across the at least one coil such that an imbalance in the currents in said live and neutral wires causes a change in phase of the alternating voltage across said at least one coil; and detecting any change in the phase of the alternating voltage with a phase sensitive detector.

* * * * *